United States Patent
Konotsune et al.

[15] 3,669,948
[45] June 13, 1972

[54] METHOD FOR PRODUCING POLY α-OLEFINS

[72] Inventors: Shiro Konotsune; Atsuyuki Kachi; Takao Tonoike; Kinya Mori, all of Yokohamashi, Japan

[73] Assignee: Chisso Corporation, Osaka, Japan

[22] Filed: Sept. 4, 1970

[21] Appl. No.: 69,919

[52] U.S. Cl..........................260/93.7, 252/429 B, 260/88.2, 260/94.9 C, 260/94.9 E
[51] Int. Cl..........................................C08f 1/56, C08f 3/10
[58] Field of Search..........................260/93.7, 94.9 C, 88.2

[56] References Cited

UNITED STATES PATENTS

| | | | |
|---|---|---|---|
| 3,300,457 | 1/1967 | Schmid et al. | 260/93.7 |
| 3,367,927 | 2/1968 | Stryker et al. | 260/93.7 |
| 3,182,049 | 5/1965 | Moberly | 260/93.7 |
| 3,219,648 | 11/1965 | Hill | 260/93.7 |

FOREIGN PATENTS OR APPLICATIONS

| | | |
|---|---|---|
| 1,020,873 | 2/1966 | Great Britain |
| 260,701 | 7/1965 | Australia |

*Primary Examiner*—Joseph L. Schofer
*Assistant Examiner*—Edward J. Smith
*Attorney*—Fred C. Philpitt

[57] ABSTRACT

Polypropylene or copolymer of propylene with another α-olefin is produced by polymerizing propylene or propylene together with another α-olefin, at a temperature below 80° C, in the presence of a three component catalyst system consisting of $TiCl_3$ or $TiCl_3 \cdot 1/3 AlCl_3$, a trialkylaluminum or dialkylaluminum halide, and polyethyleneglycol dialkylether or polyethylenethioglycol dialkylthioether, and substantially in the absence of any solvent, whereby a number of advantages can be obtained such as not only the exemption from usual drawbacks of solvent polymerization, for example, solvent loss, increase of cost necessary for solvent recovery, etc.; but also the fact that the product can be used directly to molding without removing amorphous polypropylene (APP); increase in polymerization rate; no formation of appreciable atactic polymer is the copolymerization of propylene; higher bulk density of the product; easy removal of catalyst; etc.

10 Claims, No Drawings

METHOD FOR PRODUCING POLY α-OLEFINS

DESCRIPTION OF THE INVENTION

The present invention relates to a method for polymerizing propylene alone or together with another α-olefin, and more particularly, it relates to a method for polymerizing the same in the presence of a specified catalyst system and substantially in the absence of any solvent.

It has already been known that propylene can be polymerized by the use of a three component catalyst of titanium trichloride — organoaluminum compound — polyethyleneglycol dialkylether or polyethylenethioglycol dialkylthioether system (this system will hereinafter be abbreviated merely to three component catalyst of polyether system). This three component catalyst is characterized in yielding polypropylene with a higher content of isotactic polymer than in case of two component catalyst of titanium trichloride — organoaluminum compound system. Further, the three component catalyst has heretofore been used in the polymerization in the presence of an inert organic solvent. However, the use of solvent has such drawbacks as loss of solvent itself, increase of cost necessary for solvent recovery, no utilization of atactic polypropylene discharged together with solvent, etc. In such a situation, the present inventors have studied whether or not the polymerization is possible in the presence of the three component catalyst, but substantially in the absence of solvent, and if possible, whether or not the advantages of the use of the three component catalyst attained in the polymerization carried out in the presence of solvent are still maintained in the absence of solvent. Now, we have found by carrying out the polymerization substantially in the absence of solvent, that the advantages achieved by the use of the three component catalyst of the polyether system are further more enhanced, and additionally, such advantages are brought about as acceleration of polymerization rate, increase in the monomer efficiency of copolymerization with another α-olefin, increase in bulk density, and easy removal of catalyst which has been otherwise difficult in the case of the polymerization carried out in the absence of solvent, and most surprisingly, we have found that not only the polypropylene produced according to the present method can be fully applied to various uses, as it is, without separating and removing atactic polypropylene by-produced in the polymerization according to the method of the present invention, but also the mechanical and physical properties thereof are rather superior to those of the polypropylene as obtained by the customary solvent polymerization method and whose atactic content is reduced by separation.

The present invention consists in a method for producing polypropylene or copolymers of propylene with another α-olefin which comprises polymerizing propylene or propylene together with another α-olefin at a temperature below 80° C., in the presence of a three component catalyst system consisting of one member selected from the group consisting of $TiCl_3$ and $TiCl_3·⅓AlCl_3$ which will often be hereinafter abbreviated to AA, an organo-aluminum selected from the group consisting of trialkylaluminums and dialkylaluminum halides wherein said alkyl has one to four carbon atoms and said halide is selected from chloride and bromide, and an ether selected from the group consisting of polyethyleneglycol dialkylethers and polyethylenethioglycol dialkylthioethers wherein said polyethyleneglycol or polyethylenethioglycol has two to five ethylene units and said alkyl has one to four carbon atoms, and substantially in the absence of any solvent.

As mentioned above, in the present invention, polymerization is carried out substantially in the absence of solvent although a solvent is used in an amount of as much as required for the preparation of catalyst slurry.

The substance having a formula of $TiCl_3·⅓AlCl_3$ to be used as a catalyst component instead of $TiCl_3$ itself, can be obtained by reducing titanium tetrachloride with aluminum, and particularly the former is preferred from the viewpoint of polymerization rate.

Representative examples of trialkylaluminums and dialkylaluminum halides are trimethylaluminum, triethylaluminum, triisobutylaluminum, diethylaluminum chloride, diisobutylaluminum chloride or the like.

Any polyethyleneglycol dialkylethers and polyethylenethioglycol dialkylthioethers expressed by the following general formulas, $RO-(CH_2CH_2O)_n-R'$ and $RS-(CH_2CH_2S)_n-R'$, respectively, (wherein R and R' are each a lower alkyl having one to four carbon atoms and can be the same or different, and $n$ is preferably an integer of 2 to 5) can be used, and examples thereof are diethyleneglycol dimethylether, triethyleneglycol dimethylether, tetraethyleneglycol dimethylether, tetraethyleneglycol diethylether, diethylenethioglycol dimethylthioether, triethylenethioglycol dimethylthioether, tetraethylenethioglycol diethylthioether or the like.

Polyethers in which R and R' of the above mentioned general formulas are aralkyl, aryl or cycloalkyl group may be also used.

As for the proportion of each component constituting the catalyst system, one mole or more of the organoaluminum compound per mole of titanium trichloride or AA is preferable, and polyethyleneglycol dialkylether or polyethylenethioglycol dialkylthioether (which will hereinafter be often abbreviated merely to polyether) is used in a proportion of 0.5 mole or less per mole of titanium trichloride, but a range of 0.001 to 0.3 mole is generally preferred.

As for the amount of the polyether to be used, if 0.1 mole or more thereof is used in the solvent polymerization, the polymerization activity is remarkably reduced to such an extent as making polymerization substantially impossible, whereas, in the absence of solvent, even if it is used in an amount as much as 0.5 mole, the polymerization rate is not reduced, while the polypropylene thus obtained has a higher isotactic content.

As for propylene to be used as a raw material in the method of the present invention, purified one in which even a trace amount of impurities such as oxygen, water, etc. has been eliminated, is preferred. Thus, the catalyst activity is much increased and the catalyst life is prolonged and the effectiveness of the present invention is elevated that much. The purification of propylene monomer may be carried out by treating with alumina, silica gel, molecular sieve or the like.

Another α-olefin to be copolymerized with propylene includes broadly those which are generally known as α-olefin: straight chain monoolefins such as ethylene, butene-1, hexene-1, octene-1, decene-1, branched chain monoolefins such as 3-methyl-1-butene, 4-methyl-1-pentene, styrene or the like.

The polymerization is carried out below 80° C. At a temperature higher than 80° C., the amount of atactic polypropylene formed increases to more than a certain value (i.e. about 4.5 percent). When its amount is below that value, the mechanical and physical properties of polypropylene containing the atactic polymer as it is, are still at excellent, constant values.

Thus the effectivenesses of the present invention cannot be achieved by a polymerization carried out at such a higher temperature. There is no particular limitation to the lower limit of the reaction temperature, but below room temperature is not practical. The pressure in the reaction vessel corresponds to the saturated vapor pressure of propylene monomer at the polymerization reaction temperature because of the substantial absence of solvent.

The control of the molecular weight of polypropylene can be readily carried out by using a chain transfer agent such as hydrogen in quite a similar manner to that of the solvent polymerization. However, in the polymerization of the present invention in which a three component catalyst of polyether system is used in the absence of solvent, there is hardly seen such a phenomenon that the atactic part increases with the increase of the amount of hydrogen, as generally seen in the solvent polymerization.

After completion of the polymerization reaction, an alcohol such as methyl alcohol, ethyl alcohol, n-butyl alcohol, isobutyl alcohol or the like, is added to a temperature above 50° C., in the presence of a small amount of an aliphatic or aromatic hydrocarbon to kill and remove the catalyst. This will be illustrated by the following concrete example.

After completion of the polymerization suppressed to below 80 percent in its efficiency, an alcohol is added at a temperature above 50° C., under such a pressure that propylene monomer still remains as liquid, to kill the catalyst followed by purification. Alternatively, after completion of the polymerization, unreacted propylene monomer is released and an alcohol is then added together with a certain amount of a hydrocarbon solvent. A more interesting method can be employed wherein the polymerization is carried out in the coexistence of a small amount of propane, whereby a small amount of a liquid phase is existent at the time of completion of the reaction even though the polymerization efficiency is elevated to above 80 percent, and thus this enables to do the deactivation and removal of catalyst easily without using any other solvent, and further the advantages of the polymerization carried out in the absence of solvent are not lost at all. Furthermore, according to this method, it is unnecessary to separate and remove in advance propane from fed propylene which usually contains it.

The method of the present invention has various advantages.

As for the first advantage, it has been already mentioned above; that is, not only the produced polypropylene as it is, can be applied satisfactorily to various uses e.g., for moldings, without separating and removing atactic polypropylene by-produced in the polymerization according to the method of the present invention, but also the mechanical physical properties are rather superior to those of the polypropylene which is obtained by the customary solvent polymerization method and in which the content of atactic polymer is reduced usually to 1 – 1.5 percent or less by separation and removal thereof as a solvent-soluble portion. According to the method of the present invention, the content of atactic polypropylene is generally as small as below about 4.5 percent. It is, however, a feature to be noted, of the present invention that below about 4.5 percent of the content of atactic polypropylene, the mechanical and physical properties of the resultant polypropylene remain still excellent and are kept constant, irrespective of the amount of the content. It is not yet clarified by what cause such a feature is brought about, but according to the studies of the present inventors, it is known that there is a clear difference between the IR tacticities of the substances obtained by extracting successively with diethyl ether, n-pentane and n-hexane, the polypropylene obtained by the method of the present invention and a polypropylene obtained by the solvent polymerization method in which the same catalyst is used as that of the method of the present invention (the latter method will hereinafter be often abbreviated to D-solvent polymerization method), respectively, as shown in Table 1.

TABLE 1

Relationship of successive extracts of polypropylene with various solvents to polymerization methods and IR tacticities

| Polymerization method | Solvent (1) Diethyl ether | (2) n-Pentane (from the extraction residue of (1) | (3) n-Hexane (from the extraction residue of (2)) |
|---|---|---|---|
| Method of the present invention | 0.35 | 0.72 | 0.81 |
| D-solvent polymerization method | 0.20 | 0.48 | 0.65 |

It is considered that the above-mentioned feature is also ascribed to the very even dispersion of atactic polypropylene in the entire polymer.

The second advantage of the present invention is a remarkably increased polymerization rate, namely, as much as 2.5 – 3.5 times the rate of the D-solvent polymerization method when compared at the same polymerization temperature. Accordingly, the polymerization time is shortened, and a practical polymerization is possible even at a lower temperature than the D-solvent polymerization method. Further, if the molar ratio of organoaluminum compound to titanium trichloride is increased or if the polymerization temperature is elevated, the polymerization rate tends to increase as in the solvent polymerization method.

The third advantage is that the copolymerization of propylene with another α-olefin such as those listed previously, can be more advantageously carried out than that in the solvent polymerization method. It is well known in the art that the amount of atactic polypropylene by-produced much increases in the copolymerization method compared with that in homopolymerization. However, according to the method of the present invention, the atactic polymer is scarcely formed in the copolymerization, and hence the utilization efficiency of comonomers can be improved. Moreover, the copolymerization rate according to the present invention is higher than that of the solvent polymerization method.

The fourth advantage is that a polypropylene having a high bulk density can be produced. The polymers produced by the solvent polymerization method have a bulk density of 0.25 to 0.35, whereas the polymer produced according to the method of the present invention have a value of 0.35 to 0.45. A higher bulk density enables the production apparatus to be smaller.

The fifth advantage is that the catalyst can be readily removed. Generally, operations such as deactivation and removal of catalyst after completion of the polymerization in the absence of solvent, are difficult compared with those in the solvent polymerization method. However, in the method of the present invention, the polyether in the catalyst is effective for the easy removal of catalyst.

Further, although the solvent polymerization, as previously mentioned, has such drawbacks as loss of solvent, high cost for solvent recovery, almost no utilization of discharged atactic polypropylene, etc., the method of the present invention has not such disadvantages. Thus, the utilization efficiency of propylene fed is nearly 100 percent.

The present invention will be further illustrated by way of the following Examples. Symbols described in the examples are defined as follows:

Total $R_p$: polymerization rate of total polypropylene produced = polymer (g) / TiCl$_3$·⅓AlCl$_3$ or TiCl$_3$ (g) × time (hr.)
($\nu$) : intrinsic viscosity in tetralin at 135° C.
BD : bulk density, g/c.c.
APP : atactic polypropylene (hot n-hexane soluble)

EXAMPLES 1 – 6

About 150 mg of AA (correctly weighted) was introduced into a 500 ml autoclave of rotation type, and then diethylaluminum monochloride in a molar ratio of 1.5 relative to AA and diethyleneglycol dimethylether in various molar ratios, were added to prepare a three component catalyst slurry of polyether type.

200 g of propylene monomer was added to the resultant catalyst slurry, and polymerization reaction was carried out at 50° C., for one hour, in the presence or absence of 400 ml of hydrogen further added. After completion of the reaction, unreacted propylene was purged, and 150 ml of methanol was then added at room temperature to deactivate the catalyst. After filtration and removal of the catalyst, a white polymer was obtained. The results of Examples 1 – 6 are shown in Table 2.

EXAMPLE 7

In this example, a run was carried out in a similar way to those of the foregoing examples except the following conditions: the capacity of autoclave: 10 l, AA; 2.1 g, propylene: 3.69 kg, hydrogen: 7.7 l and polymerization time: 3 hours.

The results are shown in Table 2.

the present invention. Also, in Controls 5 and 6, polymerization time was purposely prolonged at 90° C. in order to obtain a sample rich in APP. In Control 7, polymerization was carried out at 70° C., using 150 ml of n-hexane as well as 80 ml of hydrogen. The results of the above-mentioned Examples and Controls are described in Table 3, in comparison with Example 1.

TABLE 3

|  | Solvent in polymerization | Polymerization temperature (° C.) | Polymerization time (hr.) | Total $R_p$ | APP, percent | $[\eta]$ | BD |
|---|---|---|---|---|---|---|---|
| Example: |  |  |  |  |  |  |  |
| 8 | No | 10 | 1 | 25 | 0.97 | 2.08 | 0.364 |
| 9 | No | 30 | 1 | 73 | 1.58 | 1.92 | 0.370 |
| 1 | No | 50 | 1 | 266 | 2.59 | 1.91 | 0.385 |
| 10 | No | 70 | 1 | 636 | 3.73 | 1.91 | 0.400 |
| 11 | No | 80 | 1 | 780 | 4.18 | 1.80 | 0.382 |
| Control: |  |  |  |  |  |  |  |
| 4 | No | 90 | 1 | 910 | 5.28 | 1.73 | 0.378 |
| 5 | No | 90 | 2 | 760 | 6.01 | 1.75 | 0.362 |
| 6 | No | 90 | 3 | 640 | 8.45 | 1.79 | 0.369 |
| 7 | n-Hexane | 70 | 1 | 206 | 5.61 | 1.60 | 0.303 |

CONTROLS 1 – 3

Control run No. 1 was carried out in a similar way to those of Examples 1 – 6 except that a two component catalyst without polyether was substituted for the three component catalyst of polyether system.

In controls 2 and 3, polymerization was carried out at a temperature of 50° C., under a pressure of 10 kg/cm², in the presence or absence of 50 ml of hydrogen, by the use of the three component catalyst of polyether system, in 150 ml of n-hexane, and for one hour.

The results are also shown in Table 2.

From the comparison of Example 10 with Control 7, it can been seen that, under the conditions of the same three component catalyst of polyether system and the same polymerization temperature, the total $R_p$ (polymerization rate) in the polymerization in the absence of solvent is about three times that in the solvent polymerization, and the content of APP and the BD in the polymerization in the absence of solvent are considerably improved in comparison with those in the solvent polymerization.

EXAMPLES 12 – 15

In these examples, the preparation of catalyst and the

TABLE 2

|  | Polyether (molar ratio) | $H_2$ (ml.) | Solvent in polymerization | Total $R_p$ | APP, percent | $(\gamma)$ | BD | Residual percentage of catalyst by wt. (percent) |
|---|---|---|---|---|---|---|---|---|
| Example: |  |  |  |  |  |  |  |  |
| 1 | 0.015 | 400 | No | 266 | 2.59 | 1.91 | 0.385 | 71 |
| 2 | 0.015 | 0 | No | 190 | 2.50 | 9.51 | 0.370 |  |
| 3 | 0.05 | 400 | No | 235 | 1.91 | 1.84 | 0.385 | 64 |
| 4 | 0.1 | 400 | No | 208 | 1.88 | 1.92 | 0.354 | 63 |
| 5 | 0.2 | 400 | No | 187 | 1.70 | 1.82 | 0.357 | 59 |
| 6 | 0.3 | 400 | No | 179 | 1.68 | 1.94 | 0.372 | 55 |
| 7 | 0.015 | (7.7 l.) | No | 223 | 4.10 | 1.72 | 0.371 |  |
| Control: |  |  |  |  |  |  |  |  |
| 1 | 0 | 400 | No | 268 | 5.34 | 1.83 | 0.333 | 95 |
| 2 | 0.015 | 0 | n-Hexane | 108 | 3.35 | 5.25 | 0.253 |  |
| 3 | 0.015 | 50 | ...do | 121 | 4.85 | 1.98 | 0.303 |  |

From the comparison of Example 1 with Control 1 (carried out by the use of two component catalyst, in the absence of solvent), it can be seen that total $R_p$ of the former is almost the same with that of the latter, but the amount of APP in the former is about half of that in the latter. Also, from the comparisons of Examples 2 and 3 with Controls 2 and 3 (carried out by the use of three component catalyst, solvent polymerization), it can been seen that, in addition to a considerable difference in the content of APP, the total $R_{ps}$ of the formers are much larger than those of the latters. Further, it is evident that the smaller the polyether component, the higher the residual percentage of catalyst, and the polyether component is effective by the easy removal of catalyst.

EXAMPLES 8 – 11 AND CONTROLS 4 – 7

In Examples 8 – 11, the preparation of catalyst and the polymerization reaction were carried out in a similar way to Example 1 except that the polymerization temperature was varied.

In Controls 4 – 6, polymerization was carried out at 90° C. which is beyond the range of temperature to be employed in polymerization reaction were carried out in a similarly manner to Example 1 except that the molar ratios of diethylaluminum chloride (AlEt₂Cl) to AA were varied. The results are shown in Table 4 in comparison with Example 1.

TABLE 4

|  | AlEt₂Cl (Molar ratio) | Polypropylene yield (g) | Total $R_p$ | APP (%) | $[\eta]$ | BD |
|---|---|---|---|---|---|---|
| Example |  |  |  |  |  |  |
| 12 | 0.5 | 22.6 | 118 | 2.58 | 1.91 | 0.352 |
| 13 | 1.0 | 58.3 | 244 | 2.81 | 1.92 | 0.370 |
| 1 | 1.5 | 62.2 | 266 | 2.59 | 1.91 | 0.385 |
| 14 | 2.0 | 67.7 | 319 | 2.92 | 1.78 | 0.370 |
| 15 | 3.0 | 74.0 | 344 | 2.43 | 2.04 | 0.370 |

EXAMPLES 16 – 19

About 200 mg of AA (correctly weighed) was introduced into 500 ml autoclave of rotation type, and diethylaluminum monochloride in a molar ratio of 1.5 to AA and various kinds of polyethyleneglycol dialkylether or polyethylenethioglycol dialkylthioether in a molar ratio of 0.1 were separately added to prepare various three component catalysts. Into the resultant catalyst slurry were fed 500 ml of hydrogen and 200 g of propylene monomer. Polymerization was carried out at 50° C. for one hour. The results are shown in Table 5.

| | Polyether | Total $R_p$ | APP (%) |
|---|---|---|---|
| Example | | | |
| 16 | Tetraethyleneglycol dimethylether | 221 | 2.03 |
| 17 | Diethyleneglycol diethylether | 189 | 1.77 |
| 18 | Diethylenethioglycol dimethylthioether | 173 | 1.65 |
| 19 | Tetraethylenethioglycol diethylthioether | 162 | 1.51 |

EXAMPLE 20

A three component catalyst consisting of 80 mg of AA, triethylaluminum in a molar ratio of 1.0 to AA and diethyleneglycol dimethylether in a molar ratio of 0.05, was prepared. Into the resultant catalyst slurry were fed 500 ml of hydrogen and 190 g of propylene monomer. Polymerization was carried out at 50° C. for one hour. After completion of the polymerization reaction, treatment with methanol was carried out to give 131 g of a white polymer whose intrinsic viscosity [$\nu$] was 2.10 and whose insoluble part in boiling n-hexane was 81 percent.

EXAMPLE 21

The preparation of catalyst and the polymerization reaction was carried out in a similar manner to Example 1 except that 152 mg of $TiCl_3$ was used as titanium component and other catalyst components were weighed based upon it. Thus, 18.4 g of a white polymer was obtained. In this case, total $R_p$: 1.21
[$\nu$] : 1.95
insoluble part in
boiling n-hexane: 94.2 percent

EXAMPLES 22 AND 23 AND CONTROL 8

In these examples, polymerization was carried out under the same conditions as in Example 10, except reaction time. It was stopped at 40 percent of polymerization yield, and 150 ml of alcohol shown in the following Table 6 was added to the resultant system in which propylene still remained in the liquid state, followed by stirring at 30° C. for 30 minutes to deactivate and remove the catalyst. Thereafter, the ash content in the polymer was measured. In Control 8, polymerization was carried out similarly to the above except that diethyleneglycol dimethylether was not used, followed by deactivation and removal of the catalyst with methanol. These results are shown in Table 6.

TABLE 6

| | Alcohol | Ash content (ppm) |
|---|---|---|
| Example | | |
| 22 | methanol | 260 |
| 23 | isobutanol | 160 |
| Control | | |
| 8 | methanol | 500 |

The polymer yield per gram of AA was about 500 g for each of the above cases.

EXAMPLES 24 – 26 AND CONTROL 9

In these examples, polymerization was carried out under the same conditions as in Example 10, except that the polymerization reaction time was 30 minutes. After the unreacted monomer was purged, a mixed solution of a hydrocarbon and an alcohol was added to the resultant system, followed by stirring at 100° C. for 30 minutes to kill and remove the catalyst. Thereafter the ash content in the polymer was measured.

In Control 9, polymerization was carried out similarly to the above Examples except that diethyleneglycol dimethylether was not used, followed by deactivation and removal of the catalyst. These results are shown in Table 7.

TABLE 7

| | Alcohol | | Hydrocarbon | | Ash content (ppm) |
|---|---|---|---|---|---|
| Example | | | | | |
| 24 | methanol | 50 ml | n-hexane | 100 ml | 330 |
| 25 | isobutanol | 50 ml | n-hexane | 100 ml | 110 |
| 26 | isobutanol | 80 ml | toluene | 170 ml | 260 |
| Control | | | | | |
| 9 | methanol | 50 ml | n-hexane | 100 ml | 661 |

EXAMPLE 27

Polymerization was carried out under the same conditions as in Example 10 except that it was done after addition of 16 g of propane to the polymerization system. After completion of the polymerization reaction, 100 ml of methanol was added, and stirring was carried out at 80° C. for 30 minutes to deactivate and remove the catalyst. The yield of polymer thus obtained was 162 g, and its analytical values was as follows:

| Catalyst residue | : 400 ppm (as ash content) |
|---|---|
| Content of APP | : 4.0 percent |
| BD | : 0.371 |
| [$\eta$] | : 1.85 |

Thus, the effectivenesses of the present invention are still maintained.

EXAMPLE 28

Polymerization was carried out under the same conditions as in Example 10 except that 6.8 g of ethylene was added as a monomer in addition to propylene, followed by treatment with methanol to give 115 g of a white polymer.

[$\eta$] = 1.97,
Insoluble part in boiling n-hexane : 85 %,
Ethylene component in copolymer : 3.2 %

CONTROL 10

Polymerization was carried out similarly to Example 28 except that, in the polymerization, 150 ml of n-hexane was used as solvent and polymerization pressure was 10 kg/cm². The yield of polymer thus obtained was only 21 g.

[$\eta$] = 2.10,
Insoluble part in boiling n-hexane : 74 %,
Ethylene component in copolymer : 2.9 %.

TEST EXAMPLE 1

In this example, there are shown test results proving that the physical properties of polypropylene obtained according to the method of the present invention, even though it contains APP in a greater amount, are almost constantly excellent in its content below about 4.5 percent, and superior to those of polypropylene obtained according to D-solvent polymerization method and containing a smaller amount of APP. In the D-solvent polymerization method, APP content decreases by the solvent separation carried out after completion of the polymerization, that is, APP is accompanied by solvent and removed in a considerable amount. Accordingly, samples containing APP in an amount greater than such a reduced amount, were prepared by adding again the separated APP. Polymerization for such samples was carried out under the conditions of Control 3. The samples according to the method of the present invention were prepared under the conditions selected from among those of the examples. In addition, samples having greater contents of APP were prepared by using a higher polymerization temperature than those of the present invention (samples obtained from Controls 5 and 6 were selected), and examined. As for the testing method of the physical properties, the tensile strength of shaped test pieces were measured according to ASTM D–638. The results are shown in Table 8.

TABLE 8
Tensile strength of shaped test pieces (kg./cm.²)

| APP (percent) | 1.5 | 1.7 | 1.9 | 3 | 4.1 | 4.9 | 6 | 6.5 | 8.5 | 11.5 |
|---|---|---|---|---|---|---|---|---|---|---|
| Polymerization method: Method of the present invention Sample (Ex. No.) | (Ex. 5) 353. | | (Ex. 3) 354. | | (Ex. 7) 354. | | | | | |
| Case where polymerization temperature is higher than that of the present invention (Control No.). | | | | | | | | (Control 5) 340. | (Control 6) 325. | |
| D-solvent polymerization method | 350 | | 338 | | 330 | | 315 | | | 285 |

TEST EXAMPLE 2

In this test example, various other physical properties of each polymers obtained according to the method of the present invention and according to D- solvent polymerization method were compared. The results are shown in Table 9.

TABLE 9

| Polymerization method Physical properties: | Method of the present invention | D-solvent polymerization method | Measurement method |
|---|---|---|---|
| Sample | *(Ex. 7) | | |
| APP (percent) | 4.1 | 1.2 | Soxhlet extraction. |
| Melt flow rate | 9.0 | 7.2 | ASTM D-1238. |
| Form: film, 25µ thick. | | | |
| Impact strength (kg.-cm.). | 2.1 | 1.1 | ASTM D-781-59T. |
| Tear strength (g./mil) | 26.7 | 8.5 | ASTM D-1922. |
| Gloss degree (percent) | 106.7 | 76.7 | ASTM D-523-66T. |
| Sample | *(Ex. 11) | | |
| APP (percent) | 4.2 | 1.2 | |
| Melt flow rate | 5.2 | 5.0 | ASTM D-1238. |
| Form: shaped article. | | | |
| Thermal deformation temperature (° C.). | 99 | 95 | ASTM D-648. |
| Sample | *(Ex. 11) | | |
| APP (percent) | 4.2 | 1.3 | |
| Melt flow rate | 5.2 | 5.8 | ASTM D-1238. |
| Form: powders. | | | |
| Semi-crystallization time (min.). | 4 | 10.5 | Dilatometry 129.5° C. |

*Each sample was prepared based upon the conditions of example number indicated.

It can been seen from Test Examples 1 and 2 that the mechanical and physical properties of polypropylene obtained according to the method of the present invention are almost constant and superior irrespective of the content of APP.

TEST EXAMPLE 3

Polypropylene obtained under the conditions of Example 7 was treated with n-hexane to extract and remove a part of soluble component, and each mechanical and physical properties before and after the extraction were compared. The results are shown in Table 10.

TABLE 10

| Treatment | Before extraction | After extraction | Mearurement method | |
|---|---|---|---|---|
| Hexane-soluble component (%) | 4.1 | 1.6 | Soxhlet extraction | |
| Melt flow rate (230° C) (Form of sample: film 50 µ thick) | 9.0 | 8.5 | ASTM | D—1238 |
| Young's modulus (kg/mm²) | 67 | 69 | " | D—882 |
| Yield point strength (kg/mm²) | 2.1 | 2.2 | " | |
| Tear strength (g/mil) | 25.8 | 24.3 | | D—1922 |
| Impact strength (kg-cm) | 5.3 | 5.1 | " | D—781—59T |

It can be seen from the table that the mechanical and physical properties of polypropylene obtained according to the method of the present invention are almost constant irrespective of APP percent.

What is claimed is:

1. A method for producing polypropylene containing up to about 4.5 percent of atactic polypropylene which comprises polymerizing propylene in the liquid phase at a temperature below 80° C., in the presence of a three component catalyst system which consists of $TiCl_3 \cdot \frac{1}{3} AlCl_3$, dialkylaluminum halides wherein said alkyl has one to four carbon atoms and said halide is selected from the group of chloride and bromide, and an ether selected from the group consisting of polyethyleneglycol dialkylethers and polyethylenethioglycol dialkylthioethers wherein said polyethyleneglycol or polyethylenethioglycol has two to five ethylene units and said alkyl has one to four carbon atoms, wherein the mole ratio of said dialkylaluminum halide to said $TiCl_3 \cdot \frac{1}{3} AlCl_3$ is at least 1:1, and the mole ratio of said ether to said $TiCl_3 \cdot \frac{1}{3} AlCl_3$ is up to 0.5:1; and in the absence of an inert diluent or in the presence of only as much inert diluent as is required for the preparation of a slurry of the catalyst.

2. A method for producing polypropylene according to claim 1 wherein said dialkylaluminum is selected from the group consisting of diethylaluminum chloride and diisobutylaluminum chloride.

3. A method for producing polypropylene according to claim 1 wherein said ether is selected from the group consisting of diethyleneglycol dimethylether, triethyleneglycol dimethylether, tetraethyleneglycol dimethylether, tetraethyleneglycol diethylether, diethylenethioglycol dimethylthioether, triethylenethioglycol dimethylthioether, and tetraethylenethioglycol diethylthioether.

4. The method of claim 1 wherein the mole ratio of said ether to said titanium member is from 0.001:1 to 0.3:1.

5. The method of claim 1 which is carried out in the absence of an inert diluent.

6. A method for producing predominantly crystalline copolymers of propylene with another α-olefin which comprises polymerizing propylene together with another α-olefin in the liquid phase at a temperature below 80° C., in the presence of a three component catalyst system which consists of $TiCl_3 \cdot \frac{1}{3} AlCl_3$, dialkylaluminum halides wherein said alkyl has one to four carbon atoms and said halide is selected from chloride and bromide, and an ether selected from the group consisting of polyethyleneglycol dialkylethers and polyethylenethioglycol dialkylthioethers wherein said polyethyleneglycol or polyethylenethioglycol has two to five ethylene units and said alkyl has one to four carbon atoms, wherein the mole ratio of said dialkylaluminum halides to said $TiCl_3 \cdot \frac{1}{3} AlCl_3$ is at least 1:1, and the mole ratio of said ether to said $TiCl_3 \cdot \frac{1}{3} AlCl_3$ is up to 0.5:1; and in the absence of an inert diluent or in the presence of only as much inert diluent as is required for the preparation of a slurry of the catalyst.

7. A method for producing copolymers of propylene with another α-olefin according to claim 6 wherein said dialkylaluminum halide is selected from the group consisting of diethylaluminum chloride and diisobutylaluminum chloride.

8. A method for producing copolymers of propylene according to claim 6 wherein said ether is selected from the group consisting of diethyleneglycol dimethylether, triethyleneglycol dimethylether, tetraethyleneglycol dimethylether, tetraethyleneglycol diethylether, diethylenethioglycol dimethylthioether, triethylenethioglycol dimethylthioether and tetraethylenethioglycol diethylthioether.

9. The method of claim 6 wherein the mole ratio of said ether to said titanium member is from 0.001:1 to 0.3:1.

10. The method of claim 6 which is carried out in the absence of an inert diluent.

* * * * *